(12) United States Patent
Rajapakse et al.

(10) Patent No.: US 9,407,670 B2
(45) Date of Patent: *Aug. 2, 2016

(54) BROADCASTING MEDIA FROM A STATIONARY SOURCE TO MULTIPLE MOBILE DEVICES OVER WI-FI

(71) Applicant: Blackfire Research Corporation, San Francisco, CA (US)

(72) Inventors: Ravi Rajapakse, San Francisco, CA (US); Ian M McIntosh, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 14/303,527

(22) Filed: Jun. 12, 2014

(65) Prior Publication Data

US 2014/0297797 A1    Oct. 2, 2014

Related U.S. Application Data

(63) Continuation-in-part of application No. 13/561,029, filed on Jul. 28, 2012, now Pat. No. 8,839,065, and a continuation-in-part of application No. 14/083,426, filed on Nov. 18, 2013, now Pat. No. 8,762,580, which is a continuation-in-part of application No. 11/627,957, filed on Jan. 27, 2007, now Pat. No. 8,677,002.

(60) Provisional application No. 61/727,624, filed on Nov. 16, 2012, provisional application No. 61/833,928, filed on Jun. 12, 2013.

(51) Int. Cl.
*G06F 15/16* (2006.01)
*H04L 29/06* (2006.01)
*H04W 4/06* (2009.01)
*H04L 12/18* (2006.01)
*H04L 12/58* (2006.01)

(52) U.S. Cl.
CPC .......... *H04L 65/1066* (2013.01); *H04L 12/189* (2013.01); *H04L 65/4076* (2013.01); *H04L 65/608* (2013.01); *H04L 65/80* (2013.01); *H04L 69/163* (2013.01); *H04L 69/166* (2013.01); *H04W 4/06* (2013.01); *H04L 51/10* (2013.01)

(58) Field of Classification Search
None
See application file for complete search history.

(56) References Cited

U.S. PATENT DOCUMENTS

| | | | | |
|---|---|---|---|---|
| 2002/0172229 A1* | 11/2002 | Parvin | ....................... | H03L 7/00 370/521 |
| 2014/0057569 A1* | 2/2014 | Toivanen | ............ | H04M 1/7253 455/41.3 |

* cited by examiner

*Primary Examiner* — Brian P Whipple
(74) *Attorney, Agent, or Firm* — Galvin Patent Law LLC; Brian R. Galvin (57) ABSTRACT

A system for synchronized broadcast of media content across large networks, comprising a media source stored and operating on a network-connected electronic device that broadcast media content, a first media receiver stored and operating on a network-connected electronic device that receives the media content and re-broadcasts it, and a plurality of further media receivers stored and operating on network-connected electronic devices that receive the media content from the first media receiver, and a method for synchronized broadcast of media content across large networks.

5 Claims, 6 Drawing Sheets

BROADCASTING MEDIA FROM A STATIONARY SOURCE TO MULTIPLE MOBILE DEVICES OVER WI-FI

CROSS-REFERENCE TO RELATED APPLICATIONS

This application claims the benefit of, and priority to, U.S. provisional patent application Ser. No. 61/833,928, titled "BROADCASTING MEDIA FROM A STATIONARY SOURCE TO MULTIPLE MOBILE DEVICES OVER WI-FI", filed on Jun. 12, 2013, the entire specification of which is incorporated herein by reference. This application is also a continuation-in-part of U.S. patent application Ser. No. 13/561,029, titled "PACKET LOSS ANTICIPATION AND PRE EMPTIVE RETRANSMISSION FOR LOW LATENCY MEDIA APPLICATIONS" filed on Jul. 28, 2012, and is a continuation-in-part of U.S. patent application Ser. No. 14/083,426, titled "COMMON EVENT BASED MULTI DEVICE PLAYBACK, filed on Nov. 16, 2013, which is a continuation-in-part of U.S. patent application Ser. No. 11/627,957, titled "Streaming Media System and Method" and filed on Jan. 27, 2007, and also claims a benefit of, and priority, to U.S. provisional patent application Ser. No. 61/727,624, filed on Nov. 16, 2012, titled "COMMON EVEN BASED MULTIDEVICE MEDIA PLAYBACK" the entire specification of each of which is incorporated herein by reference.

BACKGROUND OF THE INVENTION

1. Field of the Art

The disclosure relates to the field of electronic multimedia playback, and more particularly to the field of broadcasting multimedia content to mobile receiver devices.

2. Discussion of the State of the Art

Today there are many mobile devices such as multimedia players, smartphones, tablet computers, or other various mobile electronic devices, that have the ability to play media to a wireless playback device (such as a speaker, stereo receiver, or television) over a radio-based wireless link such as BLUETOOTH™ or WiFi wireless data transmission protocols. If the user desires to play the media on multiple devices (for example, multiple separate "satellite" speakers) and place the devices at distances that are larger than the range of their wireless transmission (generally no more than 100 feet under ideal conditions, depending on the nature of the wireless protocols or devices being used), there is no good mechanism available.

Additionally, a user might desire to broadcast media to multiple devices with differing wireless capabilities, such as a mixture of BLUETOOTH™ and WiFi speakers. Ordinarily, this would not be possible as a broadcast can only utilize a single wireless radio or other transmission means at any given time, so the user would be restricted to only using the speakers that share similar wireless capabilities. Additionally, BLUETOOTH™ is very prevalent in mobile device hardware (such as in smartphone radio hardware), so it may be convenient to play using BLUETOOTH™ to a first playback device such as using a smartphone and then have this first playback device play to one or more additional playback devices, using WiFi that provides longer range and greater information bandwidth, allowing the devices to be placed much further apart and play in high resolution.

What is needed, is a system to broadcast media content to a plurality of media receiver devices, at least some of which may be positioned further than the maximum transmission distance from the media source, and that may enable the use of multiple different transmission protocols within a single broadcast.

SUMMARY OF THE INVENTION

Accordingly, the inventor has conceived and reduced to practice, in a preferred embodiment of the invention, a system and method for synchronized media broadcast from a mobile source, that enables the use of varying receiver devices that may be positioned across a wide distance that would not ordinarily be possible using traditional broadcast means.

According to a preferred embodiment of the invention, a system for synchronized media broadcast over large networks is disclosed, comprising a media source stored and operating on a network-connected electronic device; and a plurality of media receivers stored and operating on network-connected electronic devices. According to the embodiment, the media source connects to a first media receiver and provides media content, and the first media receiver connects to a plurality of further media receivers and provides the media content.

According to another preferred embodiment of the invention, a method for synchronized media broadcast across large networks is disclosed, comprising the steps of: broadcasting, from a media source, media content; receiving, at a first media receiver, the media content; broadcasting, from the first media receiver, the media content; and receiving, at a plurality of further media receivers, the media content.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Accordingly, the inventor has conceived and reduced to practice, in a preferred embodiment of the invention, a system and method for synchronized media broadcast from a mobile source, that enables the use of varying receiver devices that may be positioned across a wide distance that would not ordinarily be possible using traditional broadcast means.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
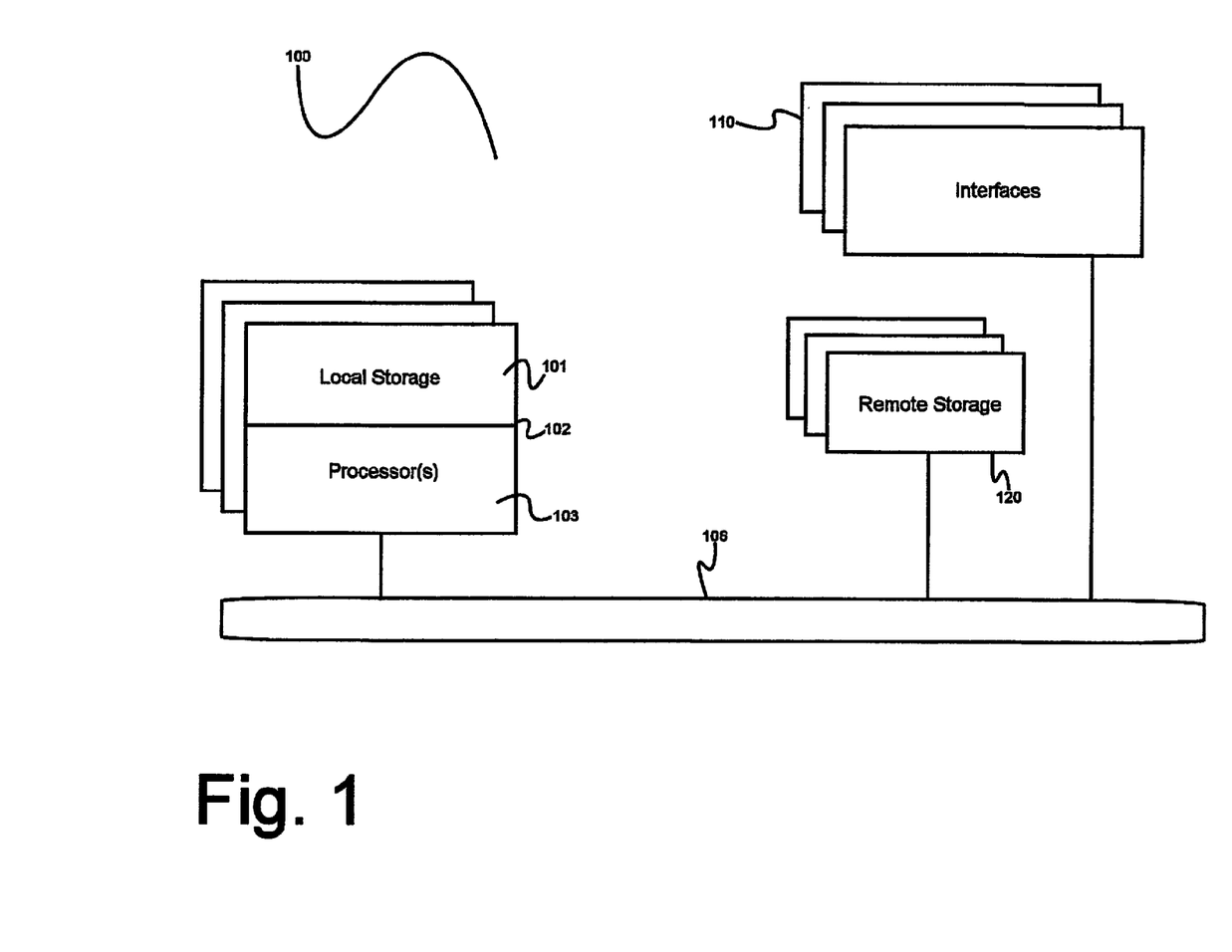
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
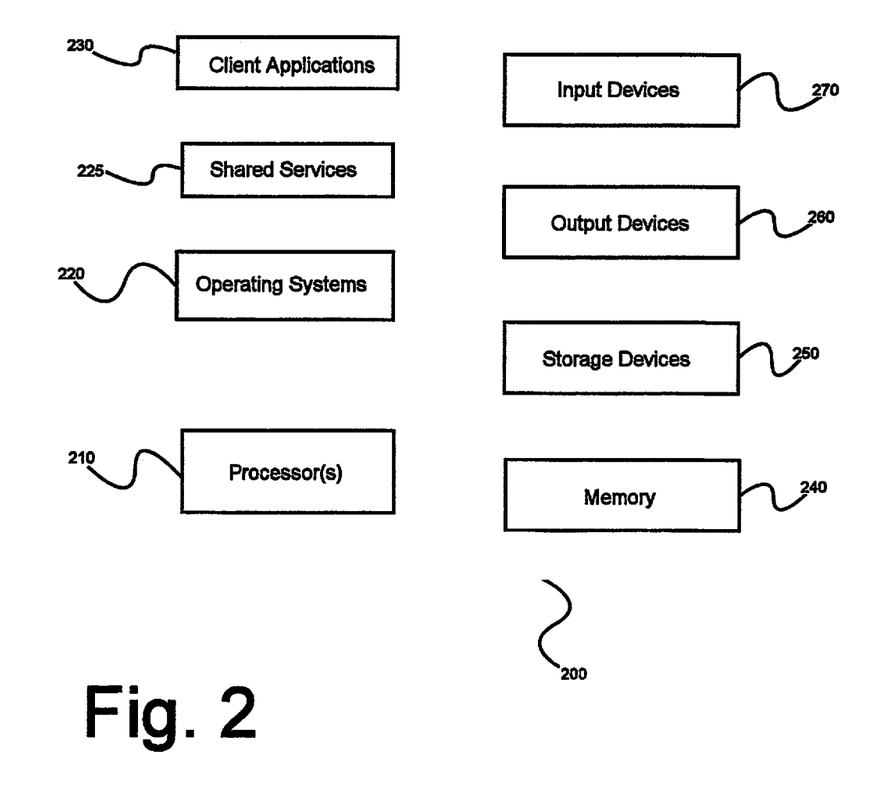
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
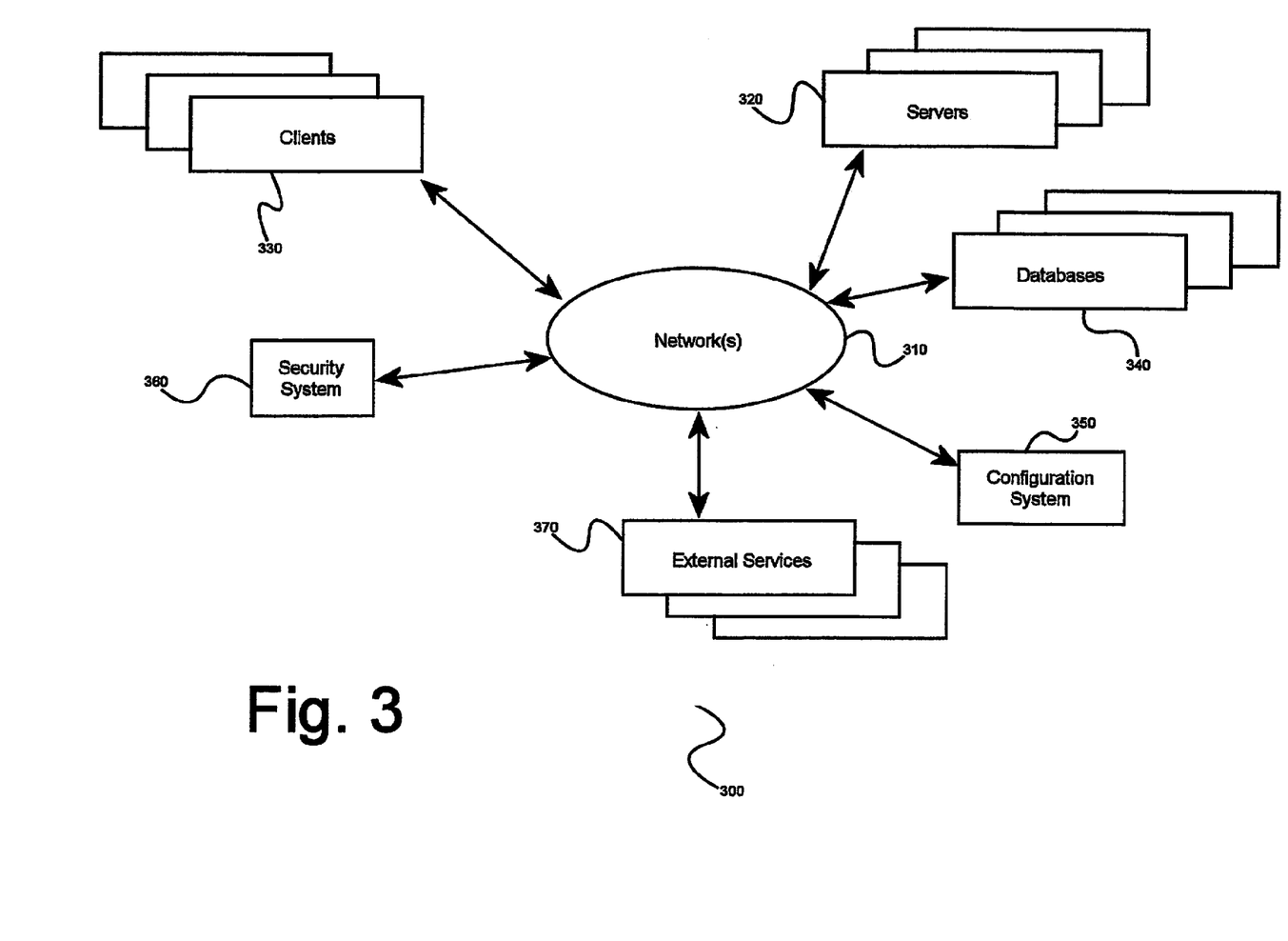
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
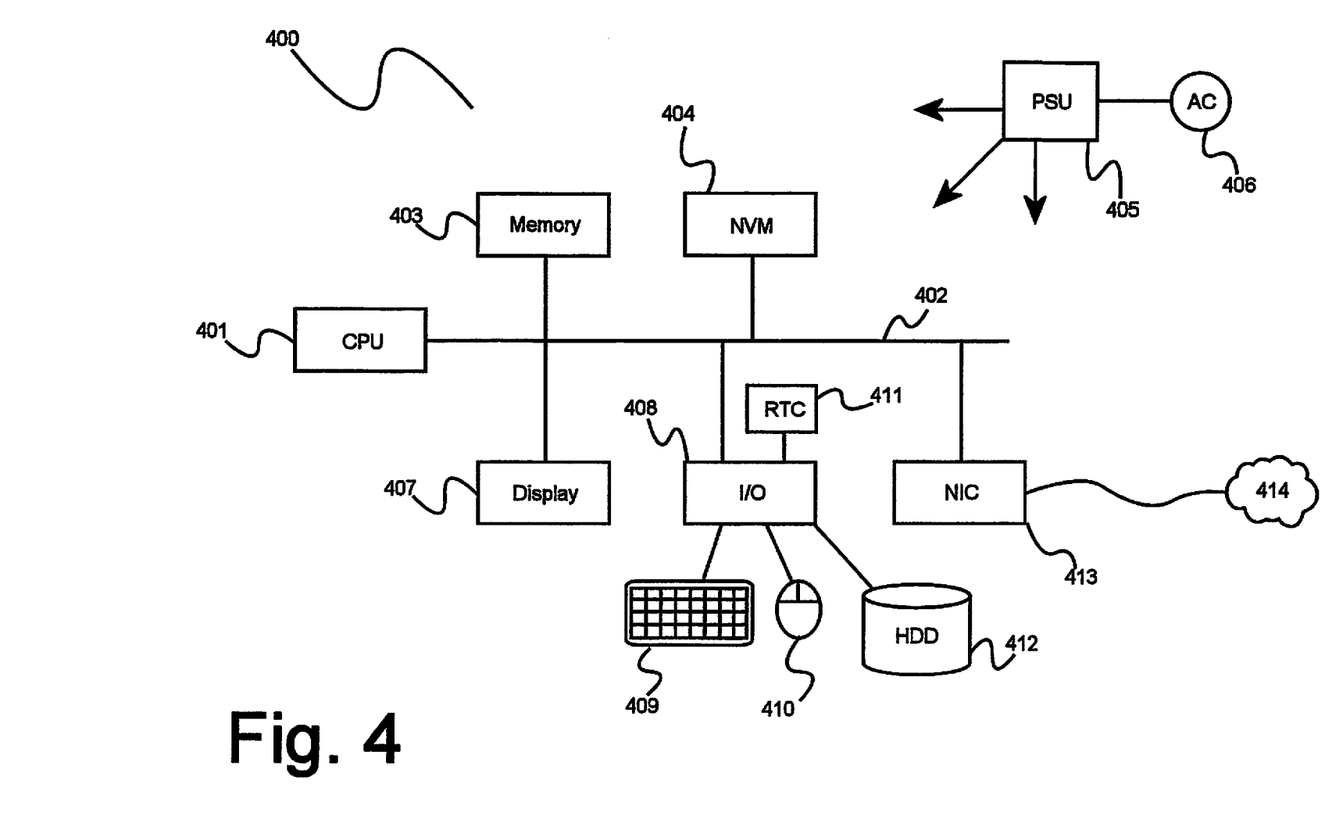
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
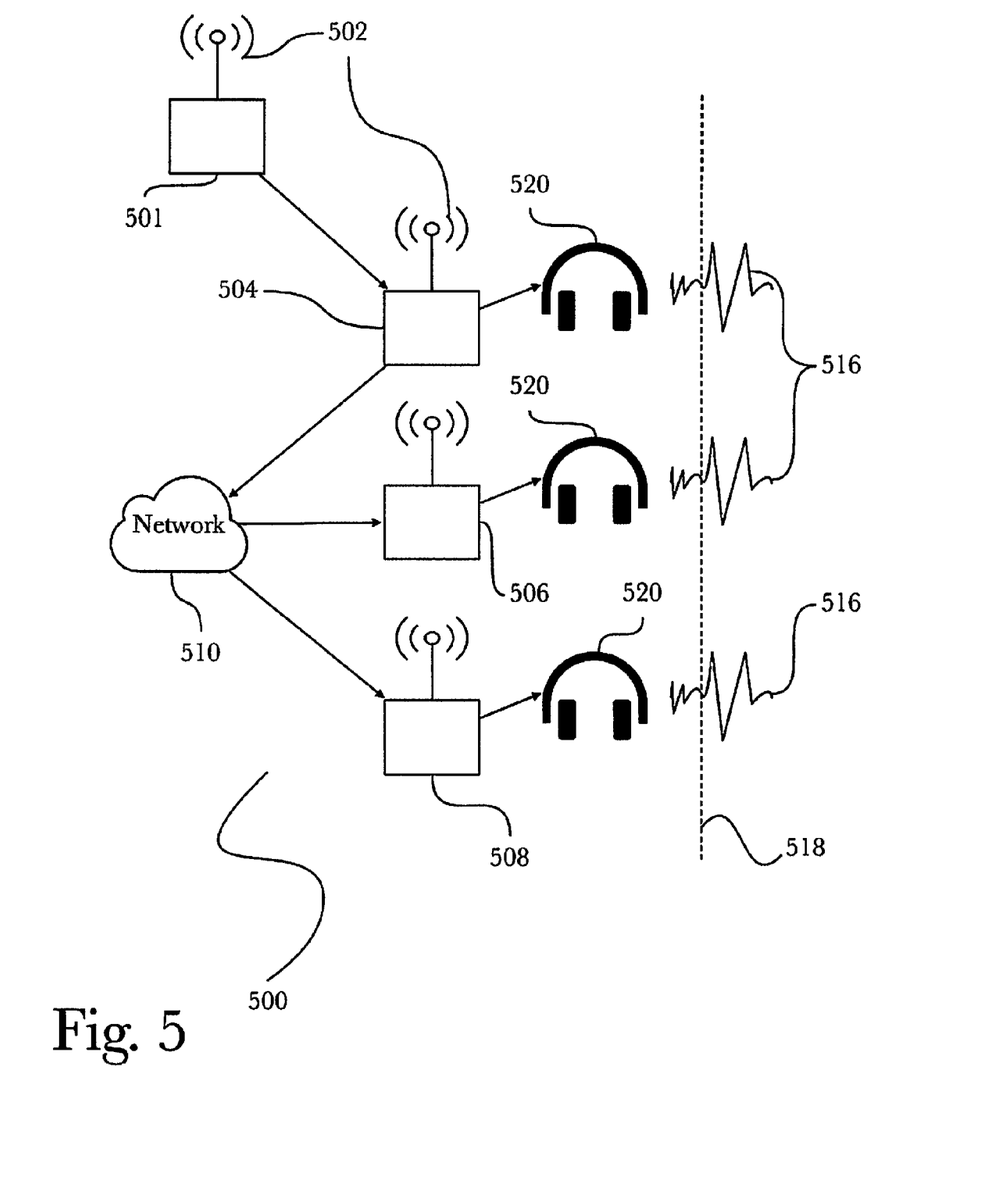
FIG. 5 is a system architecture diagram, illustrating an exemplary system for media broadcast over a large network according to a preferred embodiment of the invention.

FIG. 5 is a system architecture diagram, illustrating an exemplary system 500 for media broadcast over a large network (for example WiFi) according to a preferred embodiment of the invention. The system consists of a media source 501 which may be a phone, including all types of phones (smartphones, tablets) or mobile devices or other computing devices connected to a first playback device 504 by a BLUETOOTH™ wireless connection (for example) or other connectivity means. Additional playback devices 506 through 508 may also be present in the system and all playback devices are connected via a WiFi or Ethernet IP-based network 510, as shown. It should be appreciated that a media source may connect to a network that is also connected to a playback device (such as a home network, for example), or it may connect directly to a network-capable playback device such as a television or speaker, or any combination thereof interchangeably. In this manner a variety of network and playback configurations may be possible according to the invention, utilizing a variety of devices and connectivity means simultaneously or interchangeably as appropriate.

Each playback device may include or be connected to an audio or video component for rendering the media. The figure shows each device including a speaker 520 as an audio component for rendering audio, but it will be appreciated that a variety of arrangements are possible and may be utilized according to the invention.

A media source 501 may play media, which is then sent over a network connection 502 (such as a wired or wireless connection, for example Ethernet, WiFi, or BLUETOOTH™) to a first playback device 504. The first playback device may then send the media to additional playback devices 506, 508 over the network.

All playback devices may then render the media originating from the media source 501 simultaneously and in phase. The figure shows a representative audio wave 516 being played with the waves being in phase 518.

The First playback device 504 may contain (for example) both a BLUETOOTH™ radio and a WiFi radio (or any other arrangement of more than one network connectivity means). The other devices may contain one or more identical connectivity means as well, but these are not used for playback—for example, due to being outside of the broadcast range (for any particular connection means) relative to the media source 501.

The media source 501 may be any computing device including (for example) a cloud media source such as an Internet media streaming service (such as NETFLIX™ or YOUTUBE™), residing on the internet and connected to the first playback device 504 via a network. The media received by the first playback device 504 may be pushed to the first playback device 504 from the media source 501 or the first playback device 504 may pull/request the media from the media source 501.

In order for the media to be rendered simultaneously and in phase, each playback device may implement a media synchronization mechanism, such as the COMMON EVENT synchronization mechanism referred to above, to keep playback coordinated across multiple playback devices. The playback devices may implement other synchronization mechanisms in alternate arrangements.

The media received at the first playback device 504 over the network connection may be processed by software stored and operating on the first playback device 504 such that the media is either multicast over the network to additional playback devices 506, 508 or the media samples or frames may be copied for each playback device and each copy then unicast over the network to each individual playback device separately.

The media received at the first playback device 504 may also be received from other sources such as from a media input jack (e.g. an analog or digital audio jack) on device 504. In this case the media from the input jack, similar to the BLUETOOTH™ case, may be played locally on the first playback device and also be forwarded to additional playback devices 506, 508 where all devices play the media synchronously. This may operate in a similar fashion as the BLUETOOTH™ case described previously, but the media is received from the input jack (or other suitable direct input).

The media source 501 or the first playback device 504 may include a mechanism to select all other playback devices or a subset thereof to be used in the playback of the media.

It may also be possible for different playback devices to utilize different network connectivity means (such as BLUETOOTH™ or WiFi, for example) to connect to a network, and receive or request different media from other playback devices. For example, one media file may be played to devices via a BLUETOOTH™ connection, while different media is broadcast to devices over a WiFi connection, such that a variety of devices may connect to a variety of networks and play a variety of media content, in various combinations according to a particular desired arrangement or use case.

Detailed Description of Exemplary Embodiments

Figure 6:
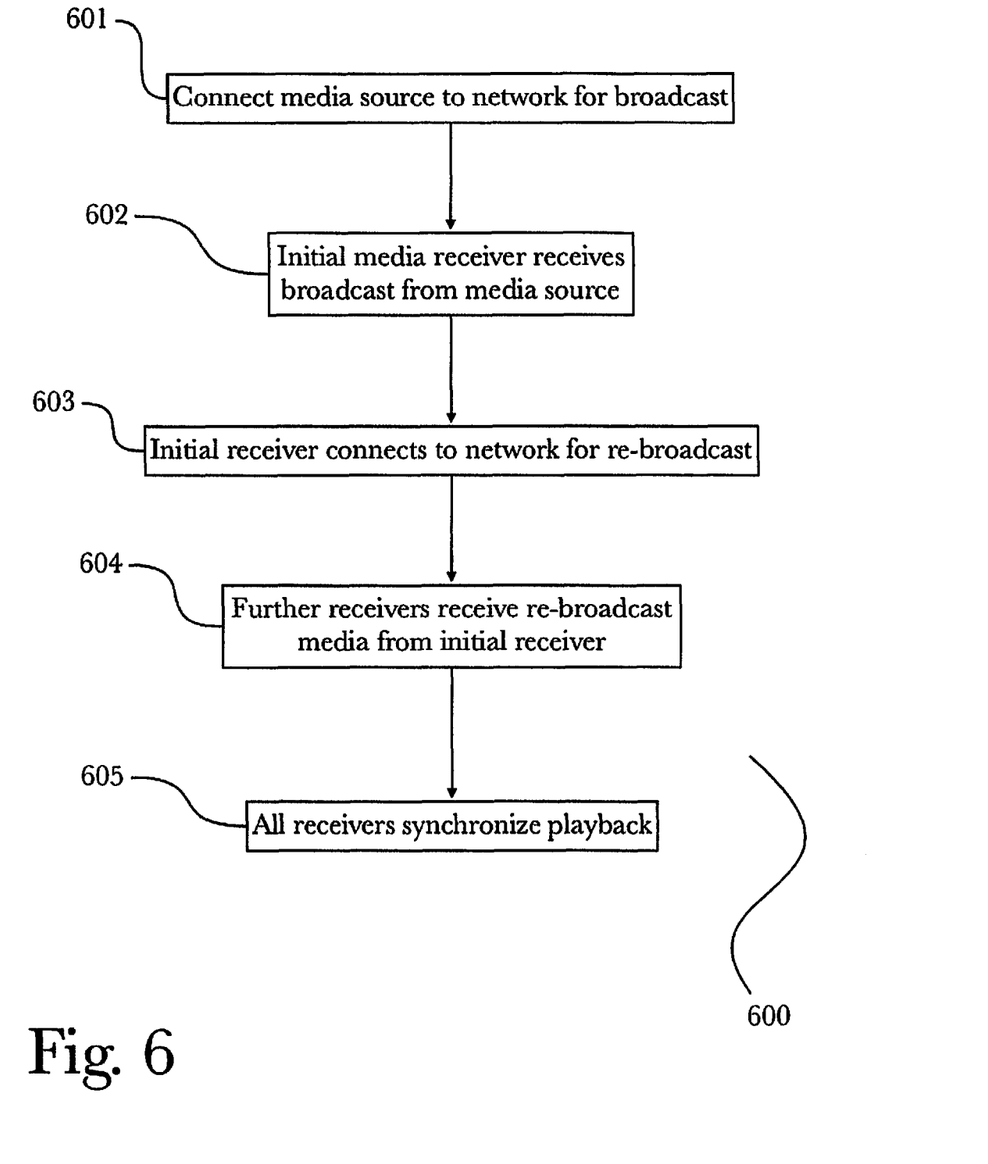
FIG. 6 is a method flow diagram, illustrating an exemplary method for media playback over a large network using multiple transmission protocols, according to another preferred embodiment of the invention.

FIG. 6 is a method flow diagram, illustrating an exemplary method 600 for media playback over a large network using multiple transmission protocols, according to another preferred embodiment of the invention. In an initial step 601, a media source may connect to a network for media broadcast, such as a wired or wireless connection to the Internet or a local area network (LAN), or a direct connection to a networked playback device such as a television or speaker. In a next step 602, a playback device may receive media content from the media source, for example a networked television receiving a video media stream. In a next step 603, the first playback device may then connect to a network (again, such as a wired or wireless Internet connection, or a connection to a LAN, or directly to another network-capable playback device) to perpetuate the broadcast of media content that it receives. In this manner, the first playback device then broadcasts the media content to a network or to other playback devices, that may not otherwise receive the media content directly from the media source, for example due to technological incompatibility or transmission distance. In a next step 604, additional playback devices may receive media content from the first playback device, such as via a wired or wireless network or a direct connection between devices, for example to extend the range of a network by enabling devices to directly broadcast media content to one another without relying on a central hub or router that might limit a broadcast range. In a final step 605, playback devices may coordinate their playback with one another such as by supplying each other with timing information, or by coordinating with a singular timing source (for example, the media source or the first playback device) that may supply timing information such that all devices are kept in sync during playback.

The skilled person will be aware of a range of possible modifications of the various embodiments described above. Accordingly, the present invention is defined by the claims and their equivalents.

What is claimed is:

1. A system for synchronous playback of media using a hybrid BLUETOOTH™ and Wi-Fi network, comprising:
   a media source stored in a memory of and operating on a processor of a first network-connected electronic device, and configured to communicate via BLUETOOTH™;
   a plurality of media receivers each respectively stored in a memory of and operating on a processor of an additional network-connected electronic device, each configured to operate a media synchronization component and configured to communicate via a Wi-Fi network;
   wherein the media source transmits media content to a first media receiver via BLUETOOTH™;
   wherein the first media receiver receives the media content from the media source via BLUETOOTH™ and transmits at least a portion of the received the media content to a plurality of second media receivers via the Wi-Fi network; and
   wherein each media receiver is configured to render the media content it receives synchronously with the media source using a media synchronization component.

2. The system of claim 1, further comprising a media synchronization service, wherein the media synchronization service provides synchronization information to the media synchronization components of at least a portion of the plurality of media receivers for media playback.

3. The system of claim 2, wherein the media source operates the media synchronization service and broadcasts the synchronization information to the media receivers.

4. The system of claim 3, wherein at least one of the media receivers uses the synchronization information during media playback.

5. A method for synchronous playback of media using a Wi-Fi network with the media originating from a BLUETOOTH™ source, comprising the steps of:
   selecting, at a media source stored in a memory of and operating on a processor of a first network-connected electronic device, media content for playback;
   transmitting the selected media content for playback to a first media receiver stored in a memory of and operating on a processor of a network-connected electronic device via BLUETOOTH™;
   receiving, via BLUETOOTH™, at the first media receiver, the selected media content from the media source;
   transmitting, from the first media receiver, the selected media content to a plurality of additional media receivers via a Wi-Fi network; and
   synchronously rendering, on each media receiver, the selected media content.

* * * * *